United States Patent Office 2,952,593
Patented Sept. 13, 1960

2,952,593
METHOD OF STABILIZING VINYL AROMATIC POLYMER FOAMS

Louis C. Rubens, Midland, Mich., assignor to The Dow Chemical Company, Midland, Mich., a corporation of Delaware No Drawing. Filed Feb. 25, 1957, Ser. No. 641,795

3 Claims. (Cl. 204—154)

This invention concerns a method of stabilizing foamed cellular vinyl aromatic polymers against shrinking upon heating at temperatures above the second order transition temperature of the polymer. It relates more particularly to a method of treating foamed cellular articles made from vinyl aromatic polymers to increase the stability of the foamed article against shrinkage at elevated temperatures.

Cellular polystyrene has been used extensively in the home and industry for many applications where its light weight and insulating properties are advantageous, notably as insulating material in the manufacture of refrigerators, deep freeze units, storage vaults, etc. The good insulating characteristics of foamed cellular polystyrene are shared to more or less extent by cellular bodies of other vinyl aromatic polymers of monovinyl aromatic compounds such as vinyltoluene, vinylxylene, ethylvinylbenzene, ethylvinyltoluene, etc.

However, cellular polystyrene as well as foamed articles made from one or more normally solid polymerized monovinyl aromatic hydrocarbons have the disadvantage that the foam tends to shrink upon heating to temperatures of about 95° C. or above, and at temperatures substantially above the heat distortion temperature of the polymer, e.g. at temperatures of from 20° to 65° C. or more above the second order transition temperature, the foam shrinks rapidly to a dense mass with resultant loss of form and insulating properties.

It is a primary object of the invention to provide cellular articles made from polymerized monovinyl aromatic hydrocarbons having high heat resistance and stabilized against shrinkage upon heating at elevated temperatures. Another object is to provide a method of treating a foamed, cellular vinyl aromatic polymer so as to improve the heat resistance of the foam and also to render it resistant to shrinkage at elevated temperatures. A specific object is to stabilize foamed polystyrene against shrinkage at elevated temperatures. Other and related objects may appear from the following description of the invention.

According to the invention the foregoing and related objects are obtained by subjecting a foamed cellular mass or body of a normally solid thermoplastic vinyl aromatic polymer, e.g. polystyrene, to the action of ionizing radiation in amount sufficient to bring about an increase in the resistance of the foam to heat but insufficient to cause any appreciable change in the mechanical properties at elevated temperatures.

Ionizing radiation as the term is well understood in the art concerns the exposure of a material, and especially a foamed polymerized monovinyl aromatic hydrocarbon of high molecular weight, to beta-rays, gamma rays, X-rays, neutrons, accelerated electrons or heavy particles, etc. Convenient sources for such radiation may be atomic piles, radio-active isotopes, X-ray equipment, electron or particle accelerators, e.g. cobalt-60 or Van de Graaff accelerators.

The amount of ionizing radiation necessary to bring about the changes in resistance to shrinkage upon heating at elevated temperatures of the foamed vinyl aromatic polymer depends in part upon the molecular weight of the polymer and in part upon the intensity of the radiations. In general, the higher the molecular weight of the polymer employed in making the foam the less the radiation required to effect a change in the resistance to heat. Also, the foams prepared from polymerized alkylstyrenes, e.g. polyvinyltoluene, require less radiation to effect a change in the resistance to heat, than is required to effect a similar change in polystyrene.

The foamed or cellular vinyl aromatic polymer bodies are subjected to the action of ionizing radiation in amount corresponding to a dose of from 100 to 900 mega REP, preferably from 100 to 600 mega REP.

It is important that the foam or cellular body be subjected to the ionizing radiation in amount sufficient to bring about an increase in the resistance of the foam to the action of heat, but insufficient to cause any appreciable change in the mechanical properties of the foam at elevated temperatures. Prolonged exposure of the foam to the ionizing radiation or exposure to radiations of high intensity for a dosage of greater than about 900 mega REP, may effect a rubber-like resilience in the mechanical properties of the foam at elevated temperatures which results in a final product which shrinks rapidly, and is to be avoided.

The following example illustrates a way in which the principle of the invention has been applied, but is not to be construed as limiting its scope.

EXAMPLE

In each of the series of experiments, a block of foamed polystyrene having the dimensions 2 x 2 x 6 inches and a density of 2 pounds per cubic foot was subjected to the action of ionizing radiation of accelerated electrons from a Van de Graaff accelerator for a dosage as stated in the following table. Test pieces in the form of two inch cubes were cut from the blocks of irradiated foam. These test pieces were used to determine a shrinking characteristic for the irradiated foam. The procedure for determining the shrinking characteristic was to immerse a test cube of the foam in an oil bath thereby displacing an equal volume of oil into a measuring bulb fitted to a device for recording any change in the volume of the test cube of the foam. The temperature of the bath was raised at a uniform rate of 1.8° C. per minute. The change in the volume of the test cube of the foam was continuously recorded on a chart and was observed from time to time. Heating of the bath was continued with gradual increase in the temperature until the test piece of foam had shrunk to a volume corresponding to from 3 to 25 percent of the volume of the test cube of foam initially used. In each experiment, the test cube of the foam decreased gradually in volume by an amount corresponding to from about 7.5 to 11.5 percent as the temperature of the bath increased to that at which the foam softened, then a slight increase in the volume of the foam corresponding to from about 3 to 12 percent was observed, due to expansion of the foam by gases in the cells, and was followed by a continued decrease in the volume of the test cube of foam due to shrinkage at the elevated temperature. The temperature of the bath at which a decrease in the volume of the test cube of the foam occurred and continued was observed and recorded. This temperature is herein called the "shrink" temperature and is reported in the following table. For purpose of comparison a test cube of non-radiated polystyrene foam was tested in similar manner. The table identifies the experiments and gives the dosage of ionizing radiation to which the polystyrene foam was subjected, the density of the foam before and after radiation and the shrink temperature of the foam.

Table

| Run No | Irradiation Dosage, mega REP | Foam Density, lbs./cu. ft. | | Shrink Temp., °C. | Color |
|---|---|---|---|---|---|
| | | Initial | After Irradiation | | |
| 1 | None | 2 | 2 | 96 | White. |
| 2 | 100 | 2 | 2 | 106 | Do. |
| 3 | 300 | 2 | 2.17 | 166 | Light Yellow. |
| 4 | 900 | 2 | 2.4 | 143 | Yellow. |

I claim:

1. A method of stabilizing a cellular thermoplastic polymer body against shrinking upon heating at temperatures above the second order transition temperature of the polymer, which method comprises subjecting a foamed cellular body prepared from a normally solid polymerized monovinyl aromatic hydrocarbon to the action of high energy ionizing radiation in amount corresponding to a dose of from 100 to 900 mega REP.

2. A method as claimed in claim 1, wherein the polymerized monovinyl aromatic hydrocarbon is polystyrene.

3. A method as claimed in claim 1, wherein the ionizing radiation is furnished by accelerated electrons.

References Cited in the file of this patent

UNITED STATES PATENTS 2,797,443    Carlson  ---------------- July 2, 1957

OTHER REFERENCES

Sun: Modern Plastics, September 1954, vol. 32, pp. 141–4, 146, 148, 150, 229–33, and 236–8.